United States Patent [19]

Turley et al.

[11] 4,007,079
[45] Feb. 8, 1977

[54] EPOXY COMPOSITION AND ITS USE AS AN ADHESIVE

[75] Inventors: Richard J. Turley, Orange; Alexandre Ozolins, New Haven, both of Conn.

[73] Assignee: Olin Corporation, New Haven, Conn.

[22] Filed: Oct. 28, 1975

[21] Appl. No.: 626,288

[52] U.S. Cl. .............................. 156/330; 260/2 EC; 260/2 N; 260/18 EP; 260/33.2 EP; 260/47 EC; 260/47 EN; 260/59 EP; 260/45.95 G; 260/78.41

[51] Int. Cl.$^2$ ......................................... C08G 59/18

[58] Field of Search ...... 260/47 EC, 47 EN, 18 EP, 260/33.2 EP, 2 EC, 45.95, 2 N, 59 EP, 78.41; 156/330

[56] References Cited

UNITED STATES PATENTS

| | | | |
|---|---|---|---|
| 3,269,961 | 8/1966 | Bruson et al. | 260/2.5 |
| 3,496,120 | 2/1970 | Davis et al. | 260/2 |

Primary Examiner—Harold D. Anderson
Assistant Examiner—E. A. Nielsen
Attorney, Agent, or Firm—F. A. Iskander; Thomas P. O'Day

[57] ABSTRACT

An improved epoxy resin composition is disclosed which incorporates a select group of chlorine-containing polyols. The improved composition is used as an adhesive and in various other applications.

16 Claims, No Drawings

EPOXY COMPOSITION AND ITS USE AS AN ADHESIVE

This invention relates to an improved epoxy resin composition and its use as an adhesive.

Various epoxy resins have been known in the prior art. Widely used such resins include the glycidyl ethers which are prepared, for example, by reacting an epihalohydrin with hydroxylated compounds. In the presence of a catalyst, these resins cure into solid materials that are commonly used in the manufacture of coatings, molding compositions and adhesives.

It has also been taught in the art to prepare halogen-containing epoxy resins which exhibit resistance to burning. To this end, U.S. Pat. No. 3,496,120 discloses the preparation of polyether epoxide compositions by reacting together an epihalohydrin, a polyol and a halogenated alkylene oxide such as 4,4,4-trichloro-1,2-epoxybutane. The polyepoxide products of such a reaction are then dehydrohalogenated to yield resinous materials which can be cross-linked into hard plastics that are said to be non-burning.

Further according to the prior art, epoxy adhesive compositions have been prepared incorporating halogenated hydrocarbons such as chlorinated polyethylene. See Russian Pat. No. 191,021.

Now according to the invention, an improvement has been found in formulating epoxy resins which on curing exhibit improved physical properties. The improvement is in adding to the epoxy resin a select chlorine-containing polyol as described in detail hereinbelow. Thus pursuant to the invention an improved, liquid, curable epoxy composition is provided which comprises (a) an epoxy resin having more than one α-epoxy group per molecule, (b) a curing agent for the resin, and (c) a chlorine-containing polyol.

Any of the variety of prior art liquid, curable epoxy resins having more than one α-epoxy group in the molecule may be used in the composition of the invention. However, it is generally preferred to employ the glycidyl ether type epoxy resins. These are generally prepared by reacting an epihalohydrin with a polyhydroxy compound in a liquid caustic medium. Such and other epoxy resins and their preparation are described in detail in H. Lee and K. Neville, *Handbook of Epoxy Resins*, McGraw-Hill, Inc., New York (1967). The entire disclosure of this book is incorporated herein by reference.

Illustrative glycidyl type epoxy resins include the glycidyl ethers of bisphenols such as bisphenol A, the glycidyl ethers of mononuclear di- and trihydric phenols, the glycidyl ethers of aliphatic polyols, the glycidyl ethers of novolac resins, and the glycidyl ethers of polynuclear phenols. Because of their ready commercial availability, the glycidyl ethers of bisphenol-A are especially preferred such as may be represented by the structural formula

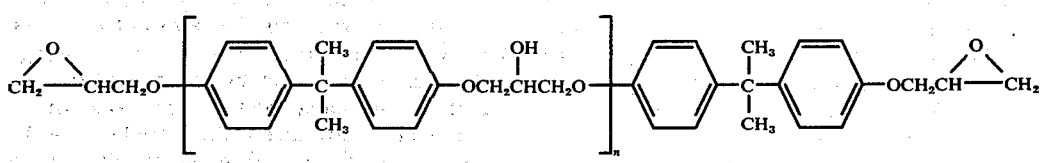

wherein n represents a number of 1 or less.

The epoxy resin composition of the invention includes a curing agent or catalyst. Here again any such material known in the prior art to be an effective curing agent for a particular epoxy resin as defined herein or for any generic group of epoxy resins may be employed where feasible or desirable. This may include two or more ingredients which act together as a curing system for the epoxy resin. The curing agent, when mixed with the epoxy resin, serves to transform it from the liquid or thermoplastic state to a hard thermoset solid; and, depending on the nature of the particular curing agent, this transformation occurs by the curing agent acting as a catalyst to promote the curing process, or the curing agent may participate in a reaction with the epoxy resin thereby becoming chemically bound into the resin chain.

Illustrative epoxy resin curing agents include basic materials, such as the Lewis bases, the inorganic bases, the primary and secondary amines, and the amides, and acidic materials such as the Lewis acids, the carboxylic acid anhydrides, and the dibasic organic acids. These and other curing agents are described in detail in the above-cited Handbook of Epoxy Resins.

The curing agent is employed in any suitable proportion which is effective in curing the epoxy resin. As is well known in the art, such proportion varies considerably depending on the chemical nature of the curing agent and on the rate of curing which is desired. Therefore, a specific proportion which is applicable in the case of one curing agent may represent an insufficient or excessive level, as the case may be, when a different curing agent is used. Thus the term "effective amount", as used in the specification and claims herein with reference to the curing agent, is intended to encompass any such proportion of a particular curing agent or group of curing agents which may suitably be used to bring about curing of the epoxy resin. For general illustration, depending on the particular material used, the curing agent may be employed in a proportion from about 4 to about 100 parts per 100 parts by weight of the epoxy resin.

In addition to the curing agent, if desired other ingredients may be added to the epoxy resin, such as taught in the prior art, in order to modify the properties of the resin or to achieve certain objectives in connection with its processing and commercial utilization. This includes, for example, fillers, solvents or diluents, resin modifiers, and plasticizers.

Pursuant to the invention, improved physical properties are imparted to the epoxy resin by incorporating or mixing therewith a select chlorine-containing polyol. This polyol is comprised of the product of condensing a polyhydroxy initiator with 4,4,4-trichloro-1,2-epoxybutane or a mixture of 4,4,4-trichloro-1,2-epoxybutane and a halogen-free epoxide.

The 4,4,4-trichloro-1,2-epoxybutane may be used in purified form or as a crude product of the dehydrohalogenation of 4,4,4-trichloro-2-halobutanol. Such crude product is described in U.S. Pat. No. 3,847,844, issued Nov. 12, 1974 to Fuzesi et al, the entire disclosure of which is incorporated herein by reference. It is thus to be understood that the term "4,4,4-trichloro-1,2-epoxybutane", as used in the specification and claims herein, includes either form of this compound. For brevity the 4,4,4-trichloro-1,2-epoxybutane is hereinafter referred to as "TCBO".

The TCBO may be used alone or, pursuant to one preferred embodiment of the invention, in combination with varying proportions of a halogen-free epoxide such as ethylene oxide, propylene oxide, and butylene oxide. In accordance with this embodiment, the halogen-free epoxide, of which ethylene oxide and propylene oxide are preferred, may be used concurrently with the TCBO, i.e., random oxyalkylation, or step-wise, i.e., block oxyalkylation before or after the reaction of TCBO with the polyhydroxy initiator. These random and step-wise oxyalkylation techniques are well known and conventionally used in the prior art. In general, step-wise oxyalkylation is preferred wherein the TCBO is first reacted with the polyhydroxy initiator, the resulting condensate being thereafter "topped" with the halogen-free epoxide.

The polyhydroxy initiator used to prepare the chlorine-containing polyol can be any compound having from 2 to 8 hydroxy groups or a mixture of two or more such compounds. Illustrative polyhydroxy compounds include ethylene glycol, propylene glycol, butylene glycol, glycerin, trimethylolpropane, triethylolpropane, sorbitol, pentaerythritol, dextrose (hydrous or anhydrous), sucrose, methyl glucoside, mixtures thereof and the like.

In accordance with the preferred embodiments of the invention, the polyhydroxy initiator contains an average of 2–6, and still more preferably 2–4, hydroxy groups. This is for two main reasons. One is that polyols having the indicated average range of functionability are generally less viscous than those having a higher hydroxy functionability. As such they lend themselves to easier handling and processing particularly when combined with the usually viscous epoxy resin. Another reason is that it has been found, according to the invention, that the lower-functionability chlorine-containing polyols have a more pronounced effect in improving the physical properties of the epoxy resin.

Although the condensation reaction of the TCBO with the polyhydroxy initiator may proceed in the absence of a catalyst, the use of a catalyst is preferred. Any acidic catalyst which is known in the art to promote this type of a reaction may be used. A large variety of such catalysts, as illustrated by the Lewis acid catalysts, can be used. These include, for example, boron trifluoride and its etherate derivatives, ferric chloride, ferrous chloride, stannic chloride, titanic tetrachloride, antimony pentachloride, aluminum chloride, aluminum bromide, hydrogen fluoride, triethyl aluminum, zinc chloride, zinc bromide, tetrabutyl titanate and so forth. The use of boron trifluoride and its etherate derivatives is particularly preferred. Small or catalytic proportions of the acid catalyst are employed as will serve to promote the condensation reaction.

The acid catalyzed condensation is carried out at any suitable temperature which is effective in bringing about reaction of the TCBO with the polyhydroxy initiator without otherwise adversely affecting the reaction or the product thereof. Temperatures ranging from about 30° C to about 200° C are illustrative. In carrying out the condensation reaction, any suitable relative proportions of reactants may be used provided at least one mole of TCBO is employed per every mole of polyhydroxy initiator. Usually such proportions are used to yield a chlorine-containing polyol product having a molecular weight ranging from about 240 to about 9,600 and preferably about 410–5,600. And pursuant to the most preferred embodiments of the invention, the proportion of TCBO that is condensed with the polyhydroxy initiator ranges from about 0.7 to about 6, and still more preferably about 1–5, moles per each hydroxy group in the initiator. Where a halogen-free epoxide is also used in preparing the chlorine-containing polyol, this can be employed in any suitable proportion such as about 0.5–10, and preferably about 0.8–5, moles of halogen-free epoxide per every mole of TCBO that is used.

The chlorine-containing polyol may be used in any proportion which is effective in improving the physical properties of the cured epoxy catalyst. For example, such a proportion may range from about 5 to about 400, and preferably about 25–250 parts per every 100 parts of the epoxy resin; and pursuant to the most preferred embodiments of the invention the chlorine-containing polyol is employed in a proportion which ranges from about 35 to about 220 parts per every 100 parts by weight of the epoxy resin.

In preparing the epoxy composition of the invention, the chlorine-containing polyol and the curing agent are simply added to, and mixed with the epoxy resin. Thereafter the mixture is allowed to cure into a hard substance. Ordinarily such curing will take place at room temperature, so that heating is not necessary, although the use of heat may be preferred in actual practice in order to enhance or speed up to the curing process.

Upon curing, the epoxy composition of the invention exhibits reduced combustibility and substantially improved adhesive bonding properties. As such it is used to advantage, according to the method of the invention, as an improved adhesive in bonding two or more surfaces together.

In utilizing the epoxy composition as an adhesive pursuant to the method of the invention, any suitable prior art bonding technique may be used. Furthermore, by virtue of its highly improved adhesive characteristics, the epoxy composition described herein can be used to bond together a wide variety of solid materials.

The following description is provided by way of illustrating the improved method of the invention as used for example in adhesively bonding two surfaces together. The surfaces are preparatorily cleaned and dried in order to remove any dirt, moisture or loose particles that may be present thereon. In the case of metallic surfaces, the cleaning step usually also involves a degreasing operation using conventional grease solvents. If desired, the metallic surfaces may further be etched by being suitably immersed in an etching solution and thereafter washed with water and dried.

The next step is to apply the epoxy composition to one or both surfaces, application to both surfaces being generally preferred in order to insure full coverage thereof. A brush or other suitable instrument may be used in applying and spreading the epoxy composition over each surface. Alternatively, the ingredients of the epoxy composition may be applied individually to each surface, these ingredients being thereafter thoroughly mixed together using a spatula or the like. The thickness of the epoxy composition layer which is applied may be varied over a wide range. However, as a practical matter, a thickness of about 0.001–0.1 inch is usually sufficient.

After the epoxy composition has been applied, the surfaces are pressed together firmly such as by using a pressure of about 1–50 psi. Then the epoxy composition is cured by holding the assembly under pressure until a permanent bond is achieved. As noted above, curing may be effected at room temperature or at elevated temperature. However, in this application the use of elevated temperature is preferred, such as about 80°–300° F and more preferably about 100°–250° F; for it has been found that along with speeding up the curing process, the use of elevated temperatures further enhances the strength of the adhesive bond.

The epoxy composition of the invention is also of utility in various other applications which call for the use of epoxy resins. For example, by virtue of its reduced combustibility, it is particularly suited for use in coating combustible material and in making resin-bonded fibrous sheets, films and panels. It is also useful in numerous potting, casting and molding applications.

The following examples are provided to illustrate the invention. All parts and percentages given are by weight unless otherwise specified. In these examples, various chlorine-containing polyols are used which are products of the condensation, in the presence of boron trifluoride etherate catalyst, of TCBO with the indicated polyhydroxy initiator. Typically in preparing these polyols, the TCBO is added to a mixture of the initiator and catalyst. Accompanied by continuous stirring, the addition is made gradually while maintaining a temperature of about 40°–65° C. After completion of the addition, the reaction is allowed to go to completion. Then the acidic catalyst is neutralized with diethanolamine and the volatile components of the reaction product are stripped off at a temperature of about 40° C and a pressure of about 0.45 m.m. of mercury.

Further in the examples, the epoxy resin used was a standard, undiluted glycidyl ether of bisphenol-A (DGEBA). In the case of Examples 1–13 and 18–19, the DGEBA used was a product of the Reichold Chemical Company, purchased under the trademark EPOTUF and further identified by the numerals "37–140". This material is characterized by the following properties Epoxide equivalent weight — 180–195
Specific gravity — 1.15–1.17
Viscosity — 11,000–14,000 cps. at 77° F.

In the case of Examples 14–17, the DGEBA was a product of Shell Chemical Company, purchased under the trademark "EPON 828".

The curing agent used in the examples was either triethylene tetramine (TETA) or another product of the Reichold Chemical Company, sold under the trademark EPOTUF and identified by the numerals "37–622". The latter is described as a modified polyamine hardener having a specific gravity of 1.01 and a viscosity of 80–150 cps. at 77° F.

EXAMPLE 1

An epoxy resin composition was prepared using DGEBA, polyamine curing agent (Epotuf 37–622) and a chlorine-containing polyol which was a condensate of 1.8 moles of TCBO per mole of ethylene glycol. For every 100 parts of DGEBA, 19 parts of the curing agent and 50 parts of the polyol were used.

The three components were thoroughly mixed together. Immediately thereafter, the mixture was used to bond two aluminum test panels together, which panels had been preparatorily cleaned in order to remove any dirt and lubricant film from the surface thereof. The procedure used to bond the panels together and to thereafter test the strength of the bond was as described in ASTM D 1002–64. Thus the panels were made of aluminum B 209, alloy 2024, T3 temper, and each panel measured 4 inches long by 1 inch wide by 0.064 inch thick. The epoxy resin composition was brushed onto each of the two facing regions of the two panels so as to insure full coverage for the 0.5 inch overlap region prescribed by the above-noted test. After the resin-brushed regions were brought in contact, a weight of 125 grams was placed thereover. This weight was maintained throughout the curing of the epoxy resin which was achieved in two stages, namely, 24 hours at room temperature followed by 2 hours at 150° F. Thereafter, the force needed to bring about failure of the bond was measured, and the lap shear strength of the bond was calculated. For an average of five duplicate tests, the lap shear strength was 3,600 pounds per square inch.

CONTROL TEST

The identical procedure of Example 1 was followed except that no chlorinated polyol was used. As a result, the lap shear strength of the bond was 1,595 psi.

EXAMPLES 2–7

In these examples, the identical procedure of Example 1 was followed except for variations in the chlorinated polyol and/or the amount thereof that was used. Details of these examples are provided in Table I below.

TABLE I

| Example No. | Chlorine-Containing Polyol Used | | | Lap Shear Strength (psi.) |
| | polyhydroxy initiator | moles TCBO/initiator mole | polyol proportion* | |
| --- | --- | --- | --- | --- |
| 1 | ethylene glycol | 1.8 | 50 | 3,600 |
| 2 | ethylene glycol | 8 | 50 | 3,200 |
| 3 | ethylene glycol | 8 | 100 | 4,000 |
| 4 | trimethylolpropane | 12 | 50 | 3,400 |
| 5 | trimethylolpropane | 12 | 100 | 3,300 |
| 6 | glycerin | 1.5 | 50 | 2,100 |
| 7 | glycerin | 8 | 50 | 3,200 |
| Control | — | — | — | 1,595 |

*parts per 100 parts by weight of the DGEBA

EXAMPLES 8–13

These examples were carried out using the exact procedure of Example 1 except for variations in the chlorine-containing polyol used. Specifically, in Examples 8 and 9, the polyol used was a condensate of one mole of ethylene glycol first with 8 moles of TCBO and then with 4 moles of propylene oxide; in Example 10, the polyol was a condensate of one mole of trimethylolpropane first with 12 moles of TCBO and then with 8 moles of propylene oxide; in Example 11, the polyol was a condensate of one mole of glycerin first with 8 moles of TCBO and then with 4 moles of ethylene oxide; and in Examples 12 and 13, the polyol had a hydroxyl number of 360 and was prepared by condensing TCBO with an equi-molar mixture of dextrose (i.e., α-d-glucose monohydrate) and ethylene glycol. The amount of the particular polyol used in each example and the lap shear strength of the adhesive bond are provided in Table II below.

TABLE II

| Example No. | Parts Polyol/100 Parts of DGEBA | Lap Shear Strength (psi.) |
|---|---|---|
| 8 | 50 | 4,200 |
| 9 | 100 | 3,600 |
| 10 | 50 | 4,000 |
| 11 | 50 | 3,300 |
| 12 | 50 | 2,700 |
| 13 | 100 | 3,100 |

EXAMPLE 14–17

Again the procedure of Example 1 was used with the following modifications. First the chlorine-containing polyol used here was the same as that used in Examples 12 and 13. Secondly, the curing agent was TETA and this was employed in the proportion of 10 parts per 100 parts of DGEBA in the case of Examples 14 and 16; and 20 parts per 100 parts of DGEBA in the case of Examples 15 and 17. Finally, curing of the adhesive was effected at room temperature for 36 hours in the case of Examples 14 and 15 and for 7 days in the case of Examples 16 and 17.

For comparison purposes, two additional control tests were made which were identical to Example 14 and 16 except that no chlorine-containing polyol was used. The data on Examples 14–17 and on the two control tests are provided in Table III below. The results given represent averages of two runs in each case.

TABLE III

| Example No. | Parts Polyol/100 Parts of DGEBA | Lap Shear Strength (psi.) | |
|---|---|---|---|
| | | 36-Hr. Cure | 7-Day Cure |
| 14 | 50 | 986 | |
| 15 | 200 | 920 | |
| Control | — | 560 | |
| 16 | 50 | | 1,035 |
| 17 | 200 | | 1,150 |
| Control | — | | 226 |

EXAMPLES 18–19

These examples are provided to demonstrate the reduced combustibility of the epoxy resin composition of the invention. In Example 18, a mixture was prepared consisting of 100 parts of DGEBA, 10 parts of TETA curing agent and 50 parts of the chlorinated polyol used in Examples 12 and 13 above; and in Example 19 the same mixture was prepared except that a different chlorine-containing polyol was employed, namely, a condensate of 8 moles of TCBO per mole of ethylene glycol. In each case the mixture was poured into an aluminum cup and cured at room temperature. Thereafter, the cured material was ignited by a flame. Burning was observed so long as the flame source was present. However, once the flame source was removed in each case combustion ceased within seconds.

For comparison purposes, the procedure was repeated except that no chlorinated polyol was included in the mixture. As a result, the cured material exhibited practically no resistance to burning after the flame was removed. Rather, the material burned through and was completely consumed by the fire.

What is claimed is:

1. A liquid, curable epoxy composition comprised of
   a. an epoxy resin having more than one α-epoxy group in the molecule,
   b. a curing agent for said resin, and
   c. a chlorine-containing polyol having an average of 2–8 hydroxy groups which is comprised of the product of the acid-catalyzed condensation of a polyhydroxy initiator with 4,4,4-trichloro-1,2-epoxybutane or a mixture thereof with a halogen-free epoxide.
2. The composition of claim 1 wherein said epoxy resin is a glycidyl ether.
3. The composition of claim 2 wherein said chlorine-containing polyol is employed in a proportion of about 25–250 parts per every 100 parts by weight of said resin.
4. The composition of claim 3 wherein said chlorine-containing polyol has an average of 2–6 hydroxy groups.
5. The composition of claim 4 wherein said epoxy resin is a glycidyl ether of a material selected from the group consisting of a bisphenol, a mononuclear dihydric phenol, a mononuclear trihydric phenol, a polynuclear phenol, an aliphatic polyol and a novalac resin.
6. The composition of claim 5 wherein said polyhydroxy initiator is selected from the group consisting of ethylene glycol, propylene glycol, butylene glycol, glycerin, trimethylolpropane, triethylolpropane, sorbitol, pentaerythritol, dextrose, sucrose, methyl glucoside, and a mixture thereof.
7. The composition of claim 6 wherein said condensation is carried out in the presence of a Lewis acid catalyst.

8. The composition of claim 7 wherein said Lewis acid catalyst is boron trifluoride or an etherate derivative thereof.

9. The composition of claim 8 wherein said epoxy resin is a glycidyl ether of bisphenol-A.

10. The composition of claim 9 wherein the chlorine-containing polyol has an average of 2–4 hydroxy groups and the proportion of said 4,4,4-trichloro-1,2-epoxybutane that is reacted with said polyhydroxy initiator ranges from about 1 to about 5 moles per every hydroxy group in said initiator.

11. The composition of claim 10 wherein said chlorine-containing polyol is a condensate of a polyhydroxy initiator first with 4,4,4-trichloro-1,2-epoxybutane and then with a halogen-free epoxide.

12. The composition of claim 11 wherein said halogen-free epoxide is ethylene oxide or propylene oxide.

13. The composition of claim 10 wherein said chlorine-containing polyol is employed in a proportion of about 35–220 parts per 100 parts by weight of said epoxy resin.

14. The composition of claim 13 wherein said polyhydroxy initiator is selected from the group consisting of ethylene glycol, glycerin, trimethylolpropane and a mixture of ethylene glycol and dextrose.

15. In a method of bonding two surfaces together by means of an adhesive, the improvement of employing as said adhesive the epoxy composition of claim 1.

16. The method of claim 15 wherein said epoxy composition is cured at a temperature of about 100°–250° F.

* * * * *